May 29, 1923.  A. GALBRAITH  1,457,157
PNEUMATIC SUSPENSION FOR WHEELED VEHICLES
Filed Nov. 25, 1921
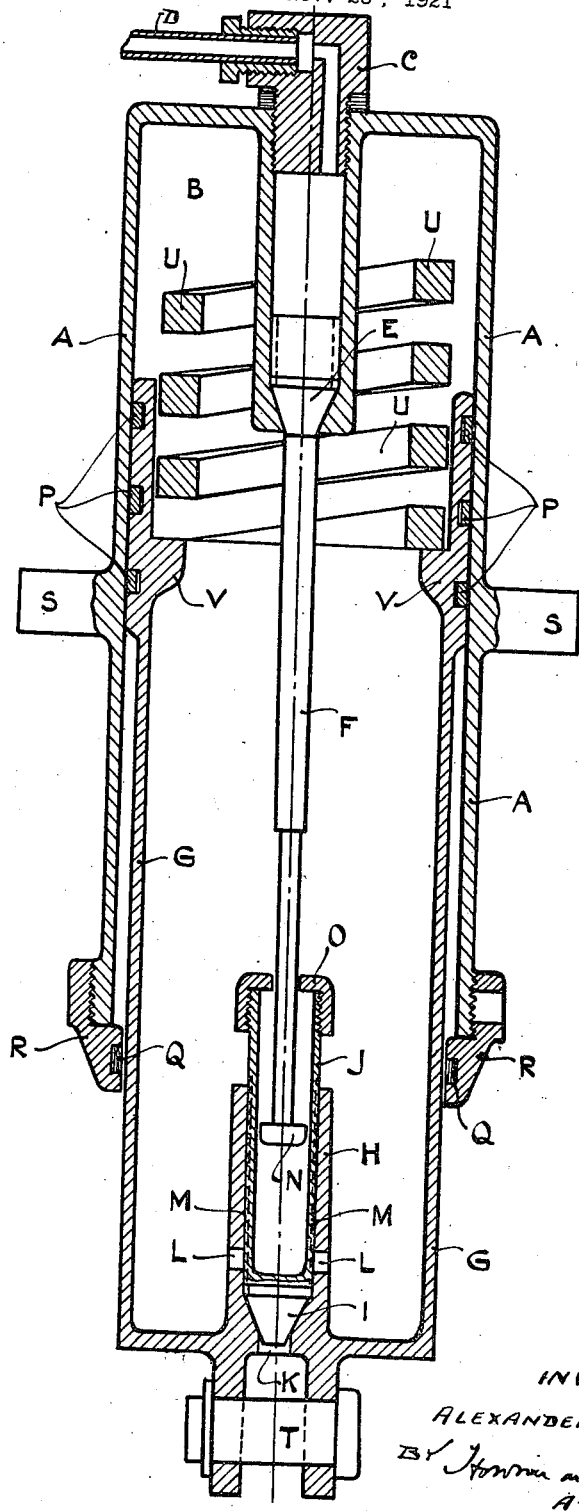
INVENTOR
ALEXANDER GALBRAITH
BY
ATTORNEYS Patented May 29, 1923.

1,457,157

UNITED STATES PATENT OFFICE.

ALEXANDER GALBRAITH, OF DALMUIR, SCOTLAND.

PNEUMATIC SUSPENSION FOR WHEELED VEHICLES.

Application filed November 25, 1921. Serial No. 517,608.

*To all whom it may concern:*

Be it known that I, ALEXANDER GALBRAITH, a subject of the King of Great Britain and Ireland, and a resident of Dalmuir, Dumbartonshire, Scotland, have invented certain new and useful Pneumatic Suspensions for Wheeled Vehicles, of which the following is the specification.

The invention has for its object a pneumatic suspension device for wheeled vehicles which automatically adjusts itself for load, and in so doing maintains a substantially constant body or platform level under various loads.

A device made according to the invention comprises essentially two hollow cylinders telescoping one within the other and closed at their outer ends. The one cylinder is adapted to be connected to and support the vehicle body, the other cylinder is adapted to be connected to the axle or running gear. Any convenient number of these devices is employed and so disposed about the vehicle as to offer adequate support.

In the closed end of one cylinder is an inlet connection to a supply of pressure air. In the closed end of the other cylinder is an outlet to the atmosphere. Inlet and outlet are controlled by valve devices which are interconnected by a rigid member (but which may be adjustable in length) passing from end to end within the cylinders.

Packing is, of course, provided between the outer surface of the inner cylinder and the inner surface of the outer cylinder.

A buffer spring may be arranged within and between the inner and the outer cylinders to take the load in the absence of air pressure.

In carrying out the invention, the inlet valve device may consist of a valve formed on the end of a rod forming the connecting element and extending between the ends of the cylinders and which valve so coacts with a seat in an inlet piece that it is raised from its seat by movement of the rod when the latter contacts with the end of the other cylinder (or a part thereon), when the cylinders collapse one within the other a determinate extent. The outlet valve coacts with a seat controlling the outlet from within the cylinders, and which valve is so operatively connected with the rod that it is raised from its seat thereby when the cylinders become extended a predetermined amount.

An illustrative example of the carrying out of the invention is shown in sectional elevation on an accompanying sheet of drawings.

In this example, the outer cylinder A is provided at its closed end with an inwardly extending hollow sleeve B. The outer end of this sleeve is adapted to receive a coupling piece C to which is connected a pipe D supplying air under pressure. At the inner end of the sleeve there is formed a seat for a valve E formed on the end of a rod F extending axially through the cylinders.

The closed end of the inner cylinder G has also formed in it an inwardly extending hollow sleeve H. A valve I formed on the end of a hollow cylinder J fitting within the sleeve, controls an outlet aperture K in the cylinder end. When the valve I is off its seat, air passes out through the aperture K by way of apertures L and past the raised valve by way of grooves M around the periphery of the cylinder J.

The cylinder J is moved endwise, so raising the valve I, by a button N on the end of the rod F which engages a cap O screwed on the end of the cylinder.

Piston rings P are provided on the inner cylinder, and for the exclusion of dust, a packing ring Q is also provided in a ring R screwed upon the outer cylinder.

Connection to the vehicle body and the running gear is respectively by way of trunnion pins S and a shackle device T.

In order to support the load on absence of air pressure, a helical spring U resting on a step V in the inner cylinder and contacting with the closed end of the outer cylinder is provided.

In operation, when the cylinders are collapsed, pressure air enters past the valve E and extends the cylinders until they support the load. Further extension causes the button N to lift the cylinder J with its valve I and the excess air escapes. A position of equilibrium is then maintained irrespective of load—so long as the load does not exceed what is proportionate to the pressure of the air supply.

What I claim is:—

1. A pneumatic suspension device for wheeled vehicles comprising a pair of hollow cylinders, telescoping one within the other and closed at their outer ends, one cylinder adapted to be connected to the body and the other to the running gear, an inlet connection to a supply of pressure air in the closed end of one cylinder and an outlet to the atmosphere in the closed end of the other cylinder, valve seats at said inlet and outlet ports, valves normally resting on said seats, the inlet valve having a pendent valve stem connected with lost motion to the outlet valve and serving to operate both valves in predetermined position of the cylinders.

2. A pneumatic suspension device for wheeled vehicles comprising a pair of hollow cylinders, telescoping one within the other and closed at their outer ends, one cylinder adapted to be connected to the body and the other to the running gear, an inlet connection to a supply of pressure air in the closed end of one cylinder and an outlet to the atmosphere in the closed end of the other cylinder, valve seats at said inlet and outlet ports, valves normally resting on said seats and operatively interconnected with lost motion, together with a cushioning spring operatively interposed between the cylinders to support the load upon failure of air pressure.

3. A pneumatic suspension device for wheeled vehicles comprising a pair of hollow cylinders, telescoping one within the other and closed at their outer ends, one cylinder adapted to be connected to the body and the other to the running gear, an inlet connection to a supply of pressure air in the closed end of one cylinder and an outlet to the atmosphere in the closed end of the other cylinder, valve seats at said inlet and outlet ports, valves normally resting on said seats and operatively interconnected with lost motion, together with a cushioning spring housed within and operatively interposed between the cylinders to support the load upon failure of air pressure.

4. A pneumatic suspension device for wheeled vehicles comprising a pair of hollow cylinders, telescoping one within the other and closed at their outer ends, one cylinder adapted to be connected to the body and the other to the running gear, an inlet connection to a supply of pressure air in the closed end of one cylinder and an outlet to the atmosphere in the closed end of the other cylinder, valve seats at said inlet and outlet ports, fixed guides associated with said ports, valves working in said guides, and a member extending between said valves and interconnecting the same with lost motion to operate the same in certain predetermined positions of the cylinders.

5. A pneumatic suspension device for wheeled vehicles comprising a pair of hollow cylinders, telescoping one within the other and closed at their outer ends, one cylinder adapted to be connected to the body and the other to the running gear, an inlet connection to a supply of pressure air in the closed end of one cylinder and an outlet to the atmosphere in the closed end of the other cylinder, valve seats at said inlet and outlet ports, a valve at the outlet port having a tubular body, a valve for the inlet port having a valve stem extending into the tubular body of the outlet valve, and a head on said valve stem working in the tubular body and serving to operate the latter through a lost motion engagement.

In testimony whereof I have signed my name to this specificaion.

ALEXANDER GALBRAITH.